United States Patent
Li et al.

(10) Patent No.: US 8,846,534 B1
(45) Date of Patent: Sep. 30, 2014

(54) PROCESS FOR CMP WITH LARGE FEATURE SIZE VARIATION

(75) Inventors: Yunfei Li, Fremont, CA (US); Ge Yi, San Ramon, CA (US); Dujiang Wan, Fremont, CA (US); Guanghong Luo, Fremont, CA (US); Lijie Zhao, Pleasanton, CA (US); Yanfeng Chen, Milpitas, CA (US); Lily Yao, Hayward, CA (US); Ming Jiang, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 221 days.

(21) Appl. No.: 13/269,453

(22) Filed: Oct. 7, 2011

(51) Int. Cl.
*H01L 21/302* (2006.01)

(52) U.S. Cl.
USPC ............... 438/692; 257/369; 438/959

(58) Field of Classification Search
USPC .......................................... 438/947
See application file for complete search history.

(56) References Cited

U.S. PATENT DOCUMENTS

| 8,262,961 | B2 * | 9/2012 | DiPietro et al. | 264/134 |
| 8,367,520 | B2 * | 2/2013 | Arena | 438/459 |
| 2008/0105355 | A1 * | 5/2008 | Kumar et al. | 156/60 |

* cited by examiner

*Primary Examiner* — Telly Green
*Assistant Examiner* — Damian A Hillman

(57) ABSTRACT

Embodiments of the present invention relate to reducing the size variation on a wafer fabrication. In some embodiments, at least a portion the backfill material over features larger than a threshold size is etched or milled to provide backfill protrusions over those features. The backfill protrusions are configured to reduce the size variation across the fabrication. Embodiments of the invention may be used in fabrication of many types of devices, such as tapered wave guides (TWG), near-field transducers (NFT), MEMS devices, EAMR optical devices, optical structures, bio-optical devices, micro-fluidic devices, and magnetic writers.

10 Claims, 12 Drawing Sheets

US 8,846,534 B1

PROCESS FOR CMP WITH LARGE FEATURE SIZE VARIATION

TECHNICAL FIELD

This invention relates to the field of chemical-mechanical planarization (CMP) and more specifically, to CMP processes for wafers with large device features size variation.

BACKGROUND

Chemical-mechanical planarization, or chemical-mechanical polishing (CMP), is process of smoothing surfaces with a combination of chemical and mechanical forces. Polishing rates during CMP are somewhat size dependent, with larger features being polished slower than smaller features. Accordingly, CMP of wafers with large size variation represents a conflict between over-polishing small sized features and under-polishing large sized features.

Many device fabrications patterned on wafers have large device size variations. For example, microelectromechanical systems (MEMS) devices, optical devices for energy assisted magnetic recording (EAMR), optical structures, bio-optical devices, micro-fluidic devices, and magnetic writers may have device size variations large enough to present a challenge to CMP processes. For example, EAMR devices sizes can vary between 400 nm to 75 µm. For magnetic writers, the size can vary from the pole tip below 100 nm to the yoke area of around 5 µm.

BRIEF DESCRIPTION OF THE DRAWINGS

The present invention is illustrated by way of example, and not limitation, in the figures of the accompanying drawings in which.

DETAILED DESCRIPTION

In the following description, numerous specific details are set forth to provide a thorough understanding of various embodiment of the present invention. It will be apparent however, to one skilled in the art that these specific details need not be employed to practice various embodiments of the present invention. In other instances, well known components or methods have not been described in detail to avoid unnecessarily obscuring various embodiments of the present invention.

The terms "over," "under," "between," and "on" as used herein refer to a relative position of one layer with respect to other layers. As such, for example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in contact with that second layer. Additionally, the relative position of one layer with respect to other layers is provided assuming operations are performed relative to a substrate without consideration of the absolute orientation of the substrate.

Embodiments of the present invention relate to reducing the size variation on a wafer fabrication. In some embodiments, at least a portion of the backfill material over features larger than a threshold size is removed to provide backfill protrusions over those features. The backfill protrusions are configured to reduce the size variation across the fabrication. Embodiments of the invention may be used in fabrication of many types of devices, such as tapered wave guides (TWG), near-field transducers (NFT), MEMS devices, EAMR optical devices, optical structures, bio-optical devices, micro-fluidic devices, and magnetic writers.

Figure 1A:
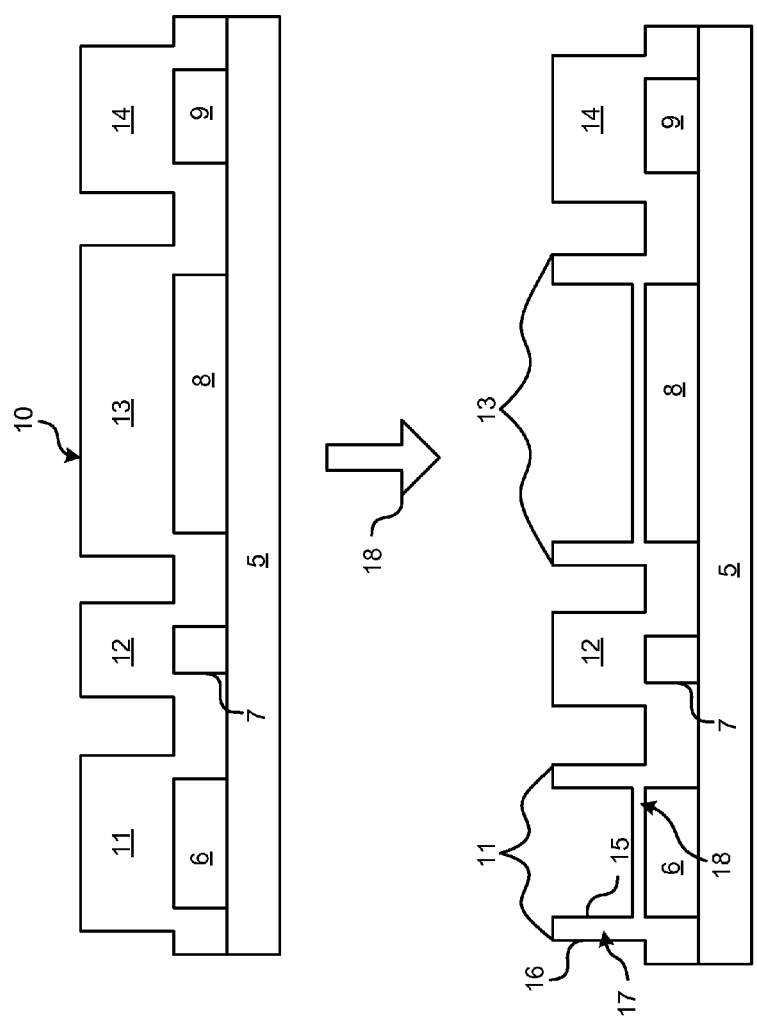
FIGS. 1A-1B illustrate a method of reducing size variation in a wafer fabrication and the product of the method.

FIG. 1A illustrates a general method of reducing size variation in a wafer fabrication and the product of the method. Initially, a wafer fabrication comprises a substrate 5 with a plurality of features 6, 7, 8, 9. As is commonly understood in the art, during fabrication, the features 6, 7, 8, 9 and the spaces between them are covered in a backfill material 10. For example, the backfill material may comprise AlOx or other common backfill materials. The backfill material 10 over the features 6, 7, 8, and 9, form corresponding backfill feature projections 11, 12, 13, and 14, respectively.

In some fabrications, the sizes of device features may vary across the device, presenting a potential challenge during CMP. Accordingly, in some embodiments, a threshold feature size is established. In some embodiments, the threshold feature size is selected as a function of the smallest features on the wafer. For example, the threshold feature size may be set as some multiple of the smallest feature size, such as between 1.25 and 3 times the smallest feature size. In a particular embodiment, the threshold features size is approximately 1.5 times the smallest feature size. Backfill feature projections for features greater than the threshold size are etched prior to CMP to reduce size variation across the wafer. In the illustrated embodiment, features 6 and 8 are greater than the threshold feature size, while features 7 and 9 are less than the threshold feature size.

In other embodiments, a threshold backfill feature projection size is established. In other words, the feature size is based on the size of the backfill feature projections, rather than the features underlying the projections. In still further embodiments, the size of the backfill feature projections is dependent on the size of the underlying features, or the two do not vary significantly in size. Accordingly, setting the threshold size based on the backfill feature projections may be equivalent to and interchangeable with setting the threshold sized based on the underlying features. Additionally, because the size of the backfill feature projections and the size of the underlying features correlate, establishing a threshold size for one establishes a threshold size for the other.

To reduce the size variation across the wafer, at least a portion of the backfill feature projections larger than the threshold sizes are removed 18. In the illustrated embodiment, the backfill feature projections are etched. In other embodiments, other material removal processes, such as ion milling, may be employed. After etching 18, the group of backfill feature projections having sizes greater than the threshold have a portion of the backfill material 10 removed, while the group of smaller backfill feature projections have not been etched.

The etched feature projections, such as projection 11, comprise a wall disposed along at least a portion of the periphery of the etched backfill feature projection 11. The wall comprises an inner sidewall 15, and outer sidewall 16, and a region of backfill material 17 disposed between the inner sidewall 15 and outer sidewall 16. In the illustrated embodiment, the inner sidewalls 15 do not extend over the underlying features. Rather, the sidewalls 15 are disposed directly over the boundary between the sidewall material 10 and the feature 6. However, on other embodiments, the sidewalls may extend over the features, or may be disposed farther away from the features. As illustrated, after etching, the larger features 11 and 13 have been reduced to one or more features having sizes less than the threshold size. Accordingly, the size variation across the wafer is reduced.

In some embodiments, a portion of backfill material 18 is maintained over the corresponding feature 6. Whether this portion 18 is maintained and its thickness may be determined according to the specifics of the CMP process employed. In general, however, the material 18 prevents over-polishing of the larger features 6 and 8. In embodiments where the material 18 is not maintained, a thicker CMP stopping layer may be employed.

Figure 1B:
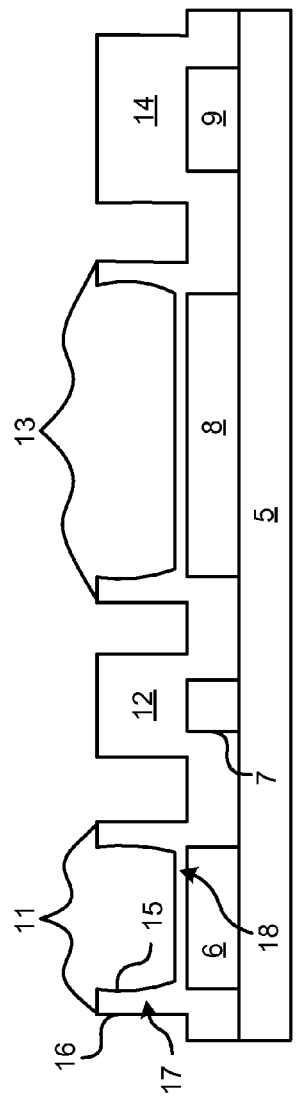
Figure 2A:
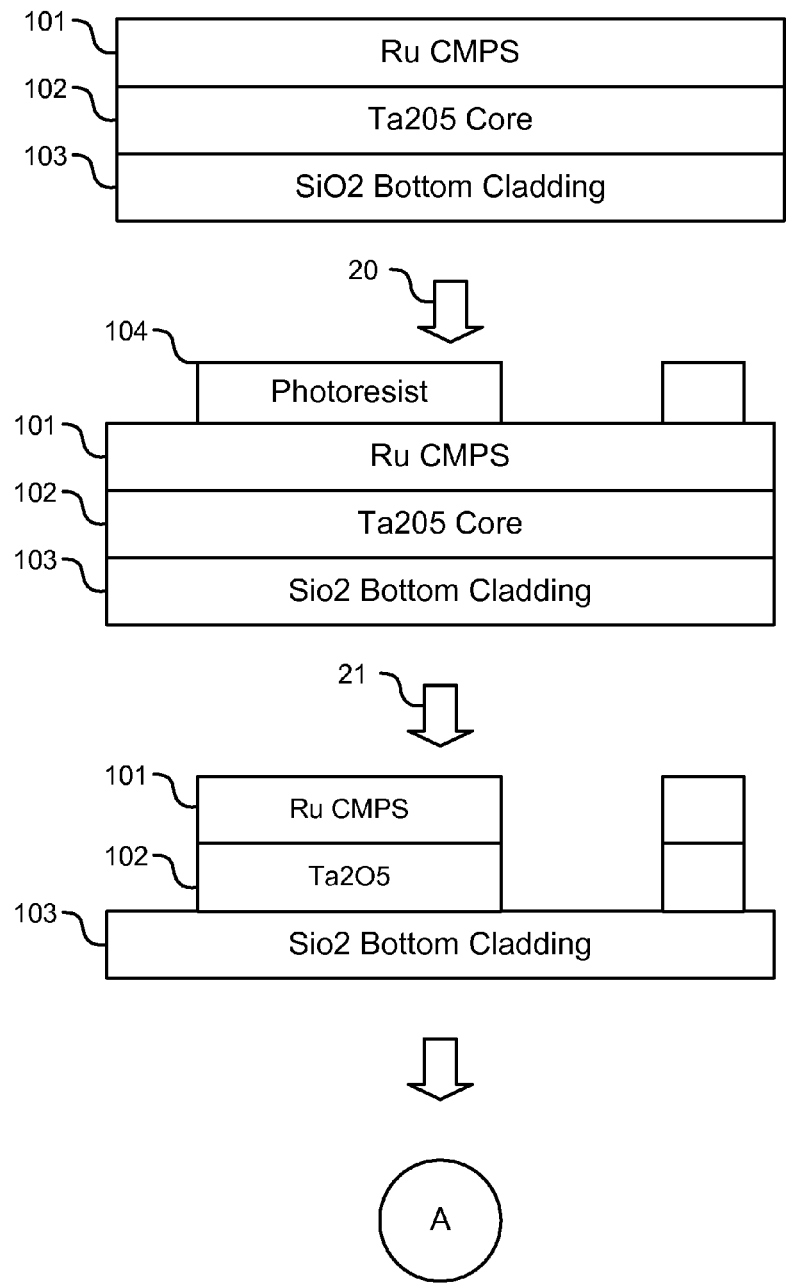
FIGS. 2A-2D illustrate a method of reducing size variation in a wafer fabrication and CMP in accordance with an embodiment of the invention.
Figure 2B:
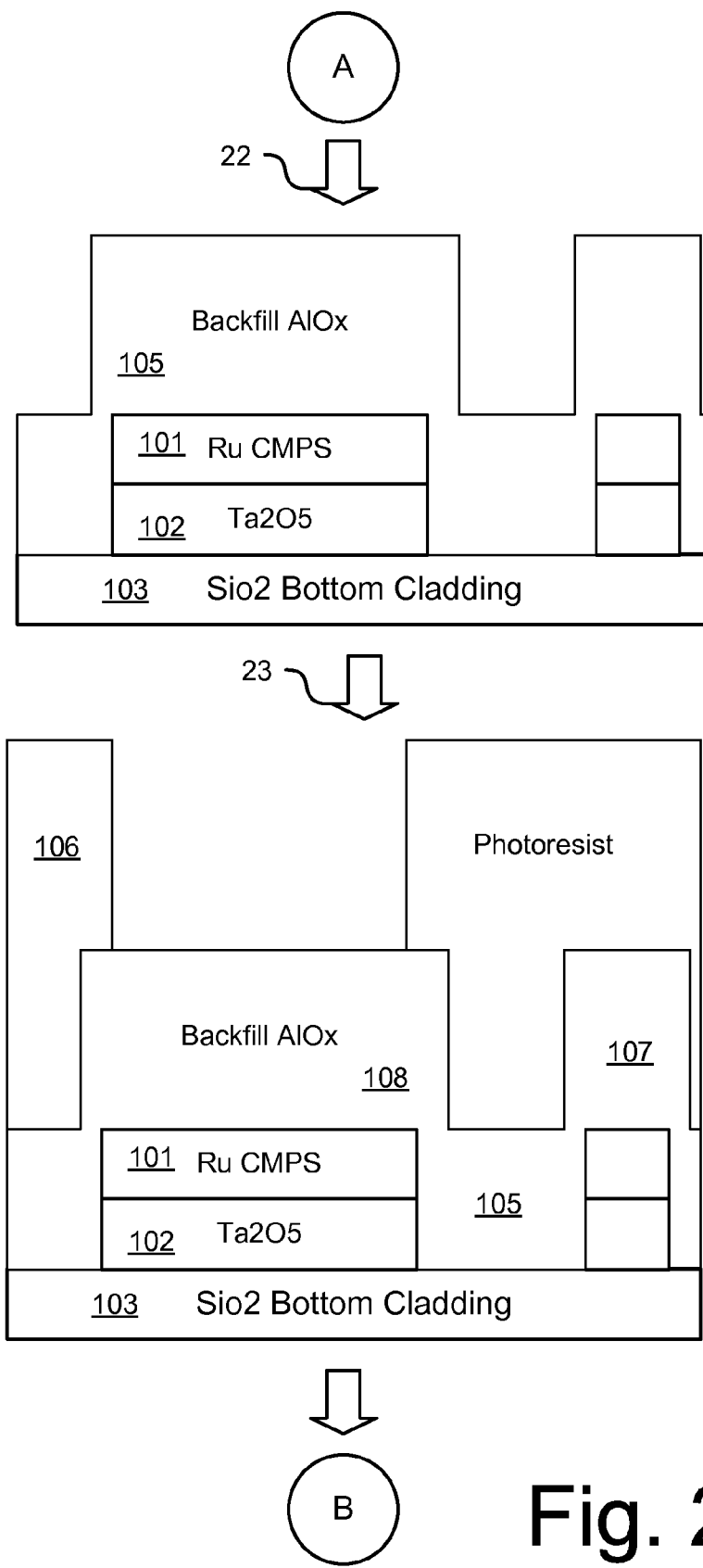
Figure 2C:
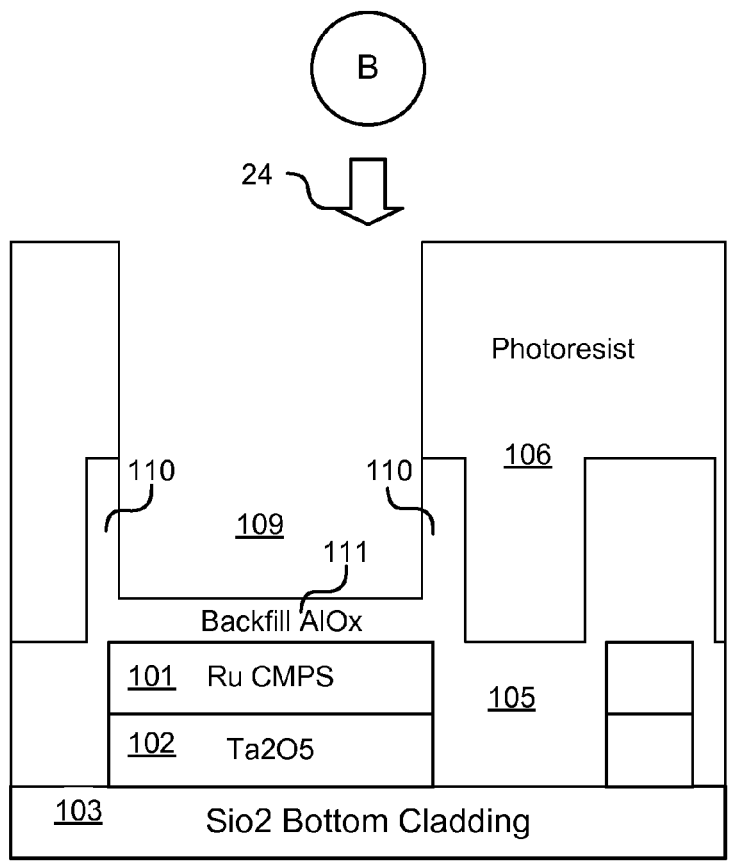
Figure 2C:
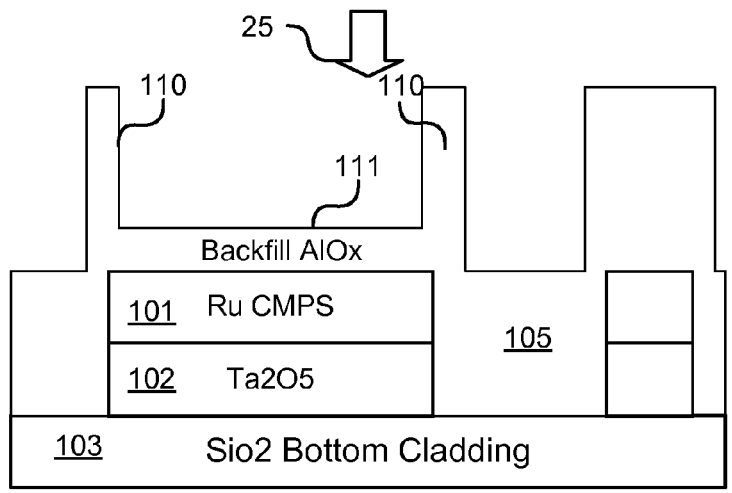
Figure 2C:
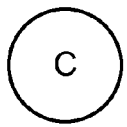
Figure 2D:
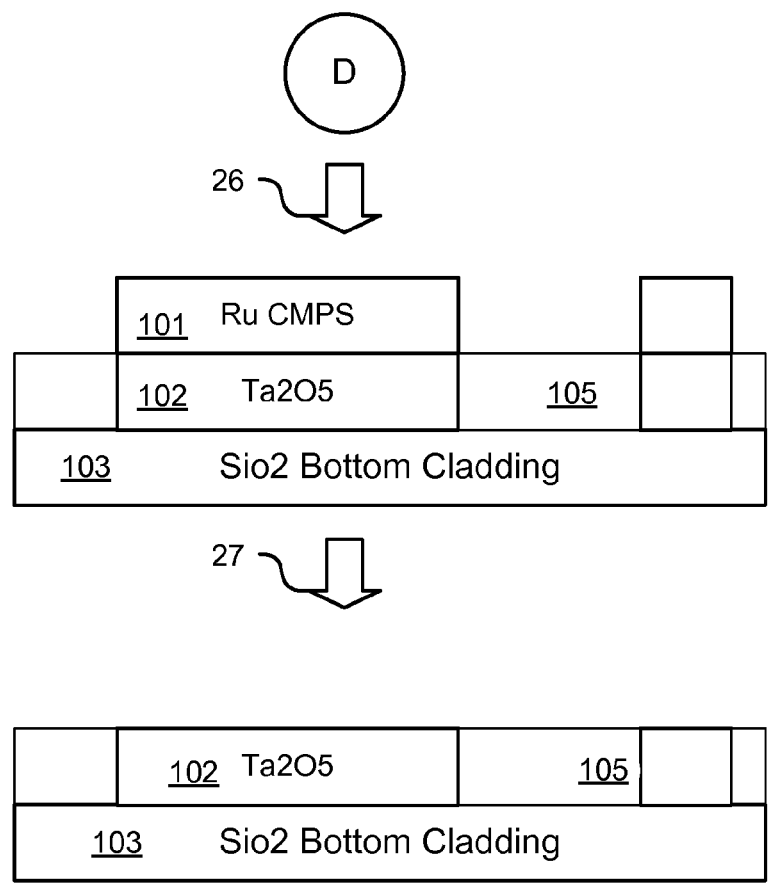
Figure 3A:
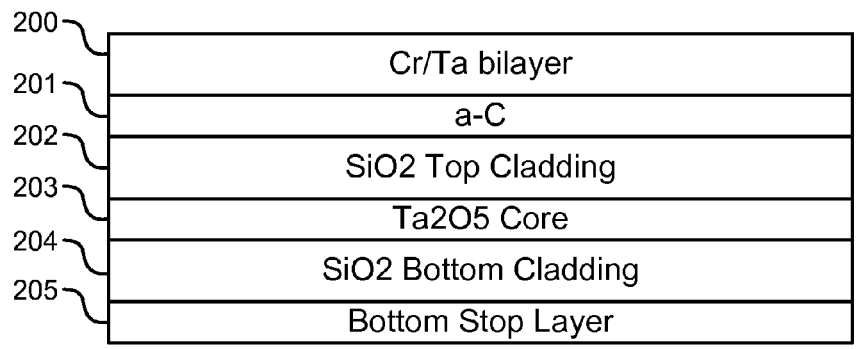
FIGS. 3A-3E illustrate a second method of reducing size variation in a wafer fabrication and CMP in accordance with a second embodiment of the invention.
Figure 3A:
Figure 3A:
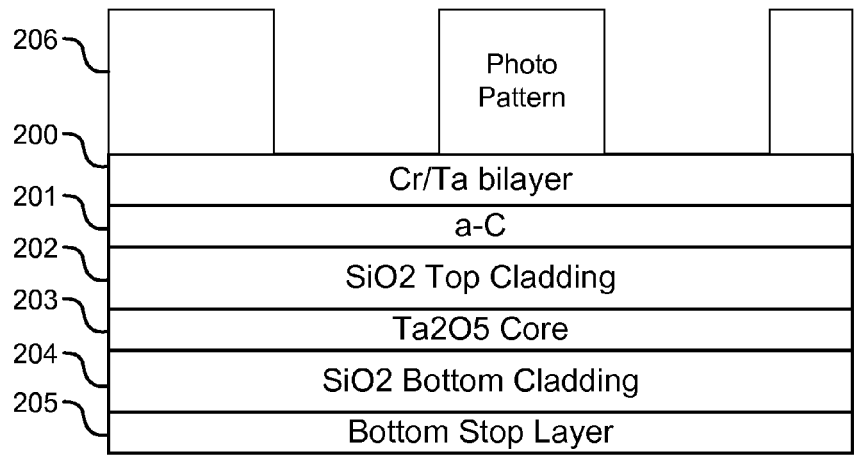
Figure 3A:
Figure 3A:
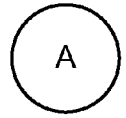
Figure 3B:
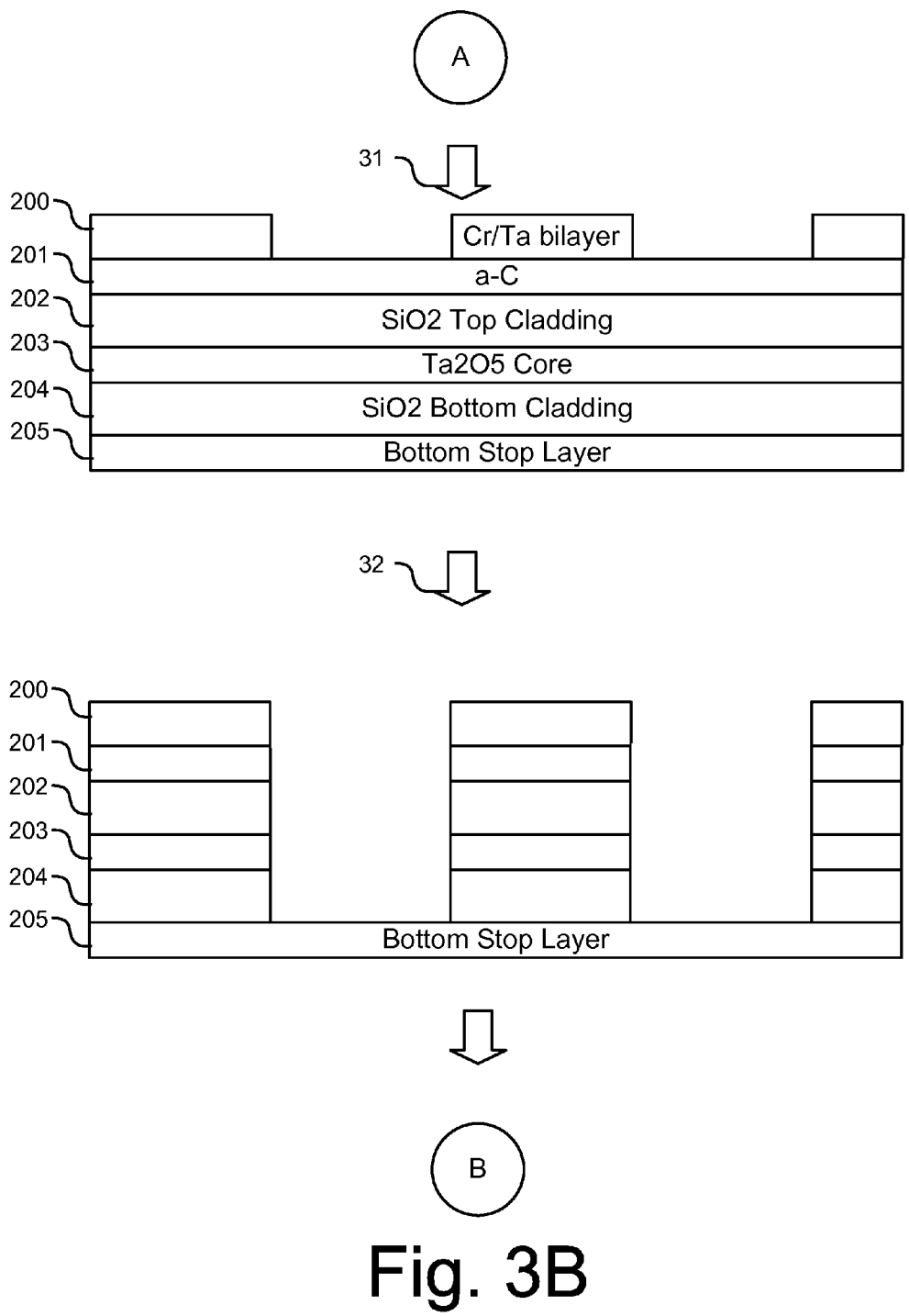
Figure 3C:
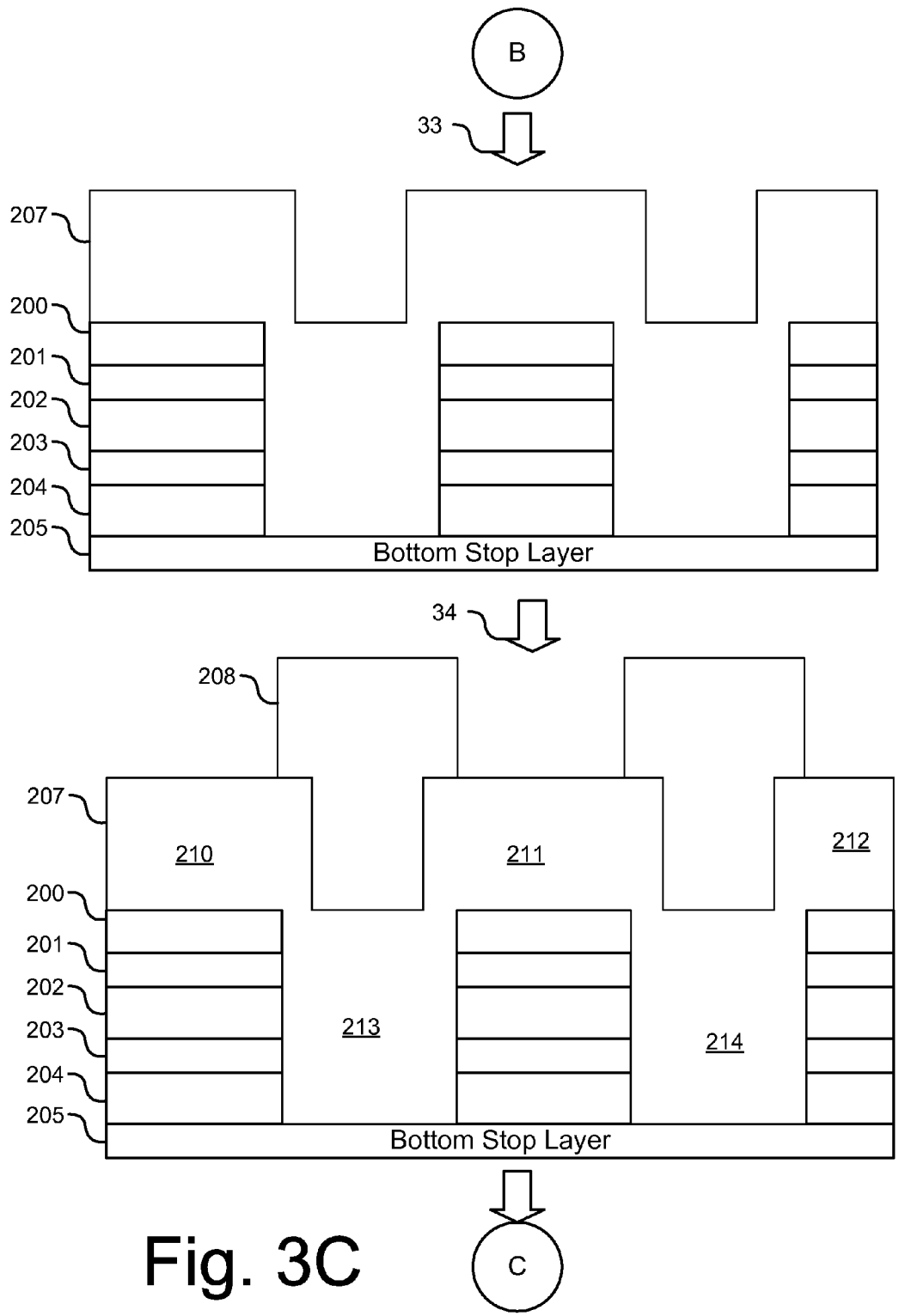
Figure 3D:
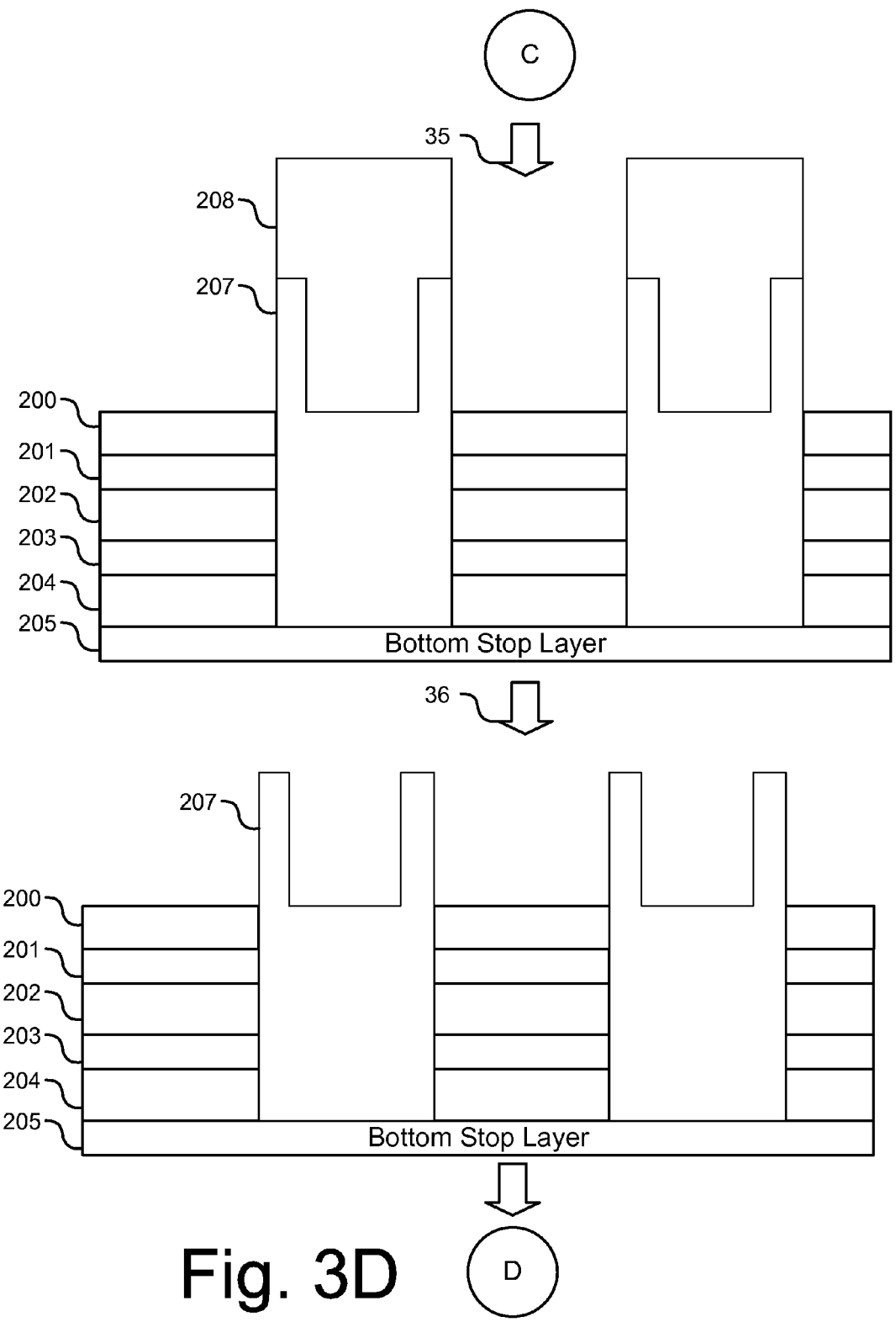
Figure 3E:
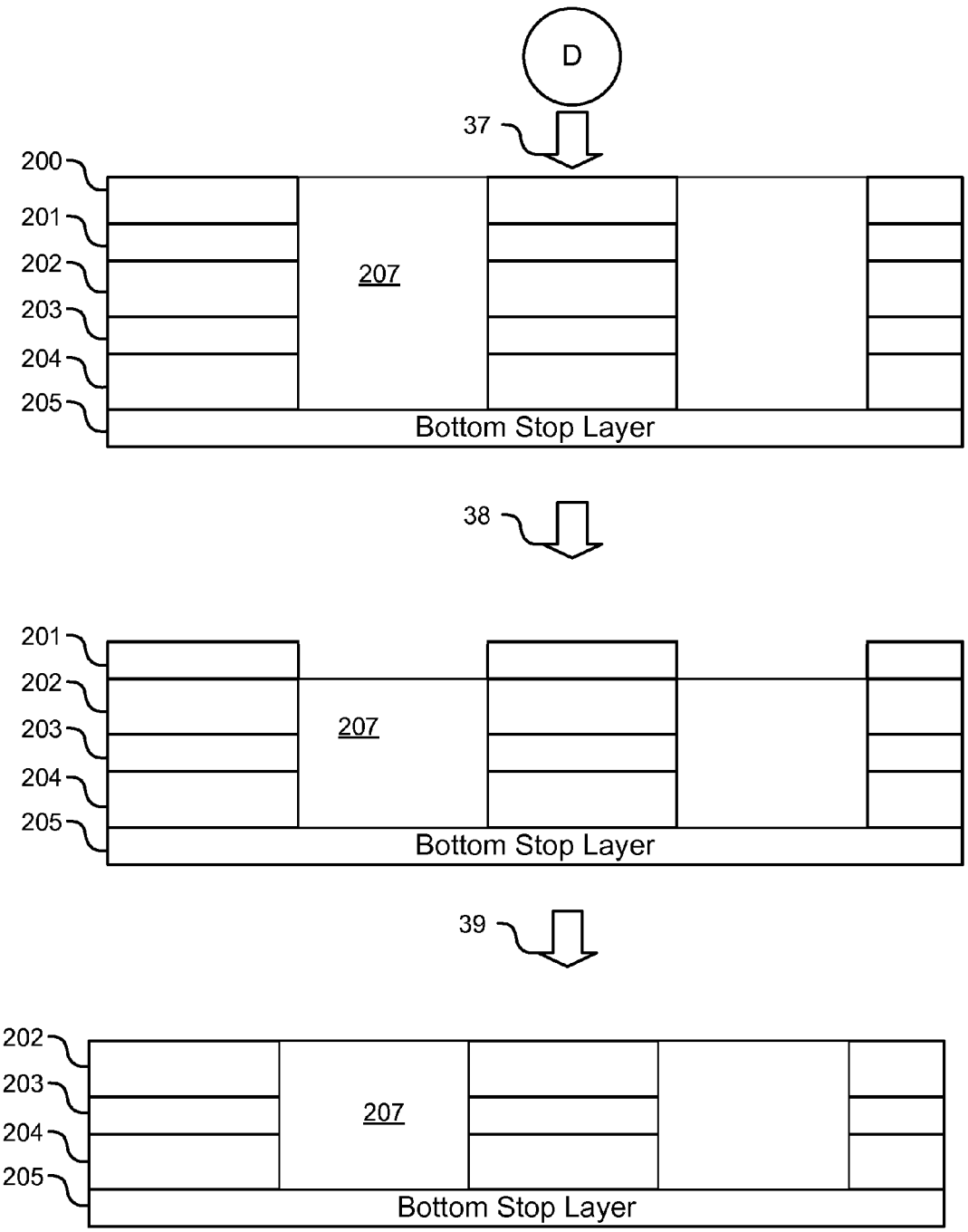

The specific profile of the etched walls depends on the etching process employed. In various embodiments, wet etching, dry etching, or a combination may be employed. Additionally, anisotropic etching, isotropic etching, or a combination of the two may be employed. In specific embodiments, reactive ion etching is employed in an isotropic and anisotropic manner. FIG. 1B illustrates an embodiment where, after etching, the width of the backfill material 17 varies with the height of the sidewall. A desired profile for the sidewalls may be achieved by varying etching parameters in the manner known in the art.

FIGS. 2A-2D illustrate a method and series of wafer assemblies implemented in accordance with an embodiment of the invention. In this illustration, the method is used to produce an AlOx based cladding TWG and NFT. The initial fabrications stack includes a substrate, a device layer, and CMPS stopping layer. The substrate includes a wafer (not pictured) and a bottom cladding layer 103 deposited over the wafer. Here, the bottom cladding layer comprises silicon oxide (SiO2). In other embodiments, other cladding materials known in the art may be employed.

A layer of material 102 for fabricating the device is deposited over the cladding layer 103. In the illustrated embodiment, this core material is Ta2O5. In other embodiments, the core material or materials will vary depending on application. A CMP stopping material 101 is deposited over the core layer 102. In the illustrated embodiment, Ru is used as a CMP stopping layer. However, other stopping layer materials used in the art may be employed in other embodiments.

In accordance with the well-known process of photolithography, a photoresist pattern 104 is applied and developed in step 20 to define the waveguide. In the illustrated embodiment, a positive photoresist 104 is applied. In other embodiments, negative photoresist may be employed. After patterning the stack assembly 20, the pattern is transferred using an etching process in step 21. In step 22, a backfill material 105 is applied over the etched stack. In the illustrated embodiment, the backfill material comprises AlOx. In other embodiments, other backfill materials known in the art may be employed.

In step 23, a photolithographic mask is used to apply a photoresist pattern 106 onto the backfilled material 105. The photoresist pattern 106 is configured to protect the backfill over features below a size threshold, such as backfill projection 107. The photoresist pattern 106 is further configured such that a portion of the backfill material 105 over features greater than the size threshold, such as feature projection 108, is exposed to an etching material. As discussed above, in some embodiments, ion milling may be used instead of, or in addition to, an etching process. In such an embodiment, the portion of the backfill material 105 is exposed to the milling beam rather than the etching material.

In step 24, the exposed backfill material is removed to a predetermined depth. In the illustrated embodiment, the removed portion 109 corresponds to the portion of backfill material 105 that was deposited directly over the corresponding feature. Accordingly, after removal, walls 110 of the backfill material remain deposited around the perimeter of the corresponding feature. Further, in the illustrated embodiment, a portion 111 of backfill material remains deposited directly over the corresponding feature.

In step 25, the photoresist 106 is removed. After this step, variance in feature size for CMP has been reduced. Features projections 109 are now smaller than the initial backfill feature projection 108. This simplifies the future CMP step.

In step 26, CMP is applied to planarize the wafer assembly. The backfill material 105 is removed down to the CMP stop layer 101. This CMP step may be performed in any manner used in the art. After removal of the CMP stop layer 101 in step 27, the resultant wafer assembly is substantially planar.

FIGS. 3A-3E illustrates a process flow for a SiO2 based cladding tapered wave guide fabrication implemented in accordance with an embodiment of the invention. In this embodiment, the initial stack comprises a bottom etch stop layer 205, a bottom SiO2 cladding layer 204, a Ta2O5 core layer 203, a top SiO2 cladding layer, an optional layer of amorphous carbon 201, and a bilayer 200 of Cr and Ta.

In step 30, an initial photo lithography process defines the device. After developing, the photolithography pattern 206 is configured to provide the device features onto the wafer. In step 31, in accordance with common photolithographic techniques, the pattern is transferred to a hard mask by etching the Cr/Ta bilayer 200. Afterwards, in step 32 the device pattern is transferred to the stack. Next, in step 33, backfill material 207 is applied to the patterned stack.

In step 34, a photolithographic pattern 208 is applied to reduce the feature size variation on the wafer. In the illustrated embodiment, each of the feature projections 210, 211, and 212 are larger than the threshold. Accordingly, the pattern 208 is deposited over the trenches 213 between the features.

In step 35, the patterned wafer is etched. In one embodiment, this etching comprises RIE using the photoresist pattern as a hard mask. In step 36, the photoresist 208 is removed in a conventional manner.

In the illustrated embodiment, a layer of amorphous carbon 201 allows the use milling to finalize the planarization. Accordingly, in step 37 a light CMP process is used to remove the backfill material 207 to the level of the Cr/Ta bilayer 200. After step 37, a milling operation removes the Cr/Ta bilayer and backfill material 207 adjacent to the amorphous carbon layer 201. In some embodiments, the milling operation is optional, and may be forgone by eliminating the amorphous carbon layer 201. After milling, in step 39 the amorphous carbon layer is removed, resulting in a planarized wafer patterned with the device.

Figure 4:
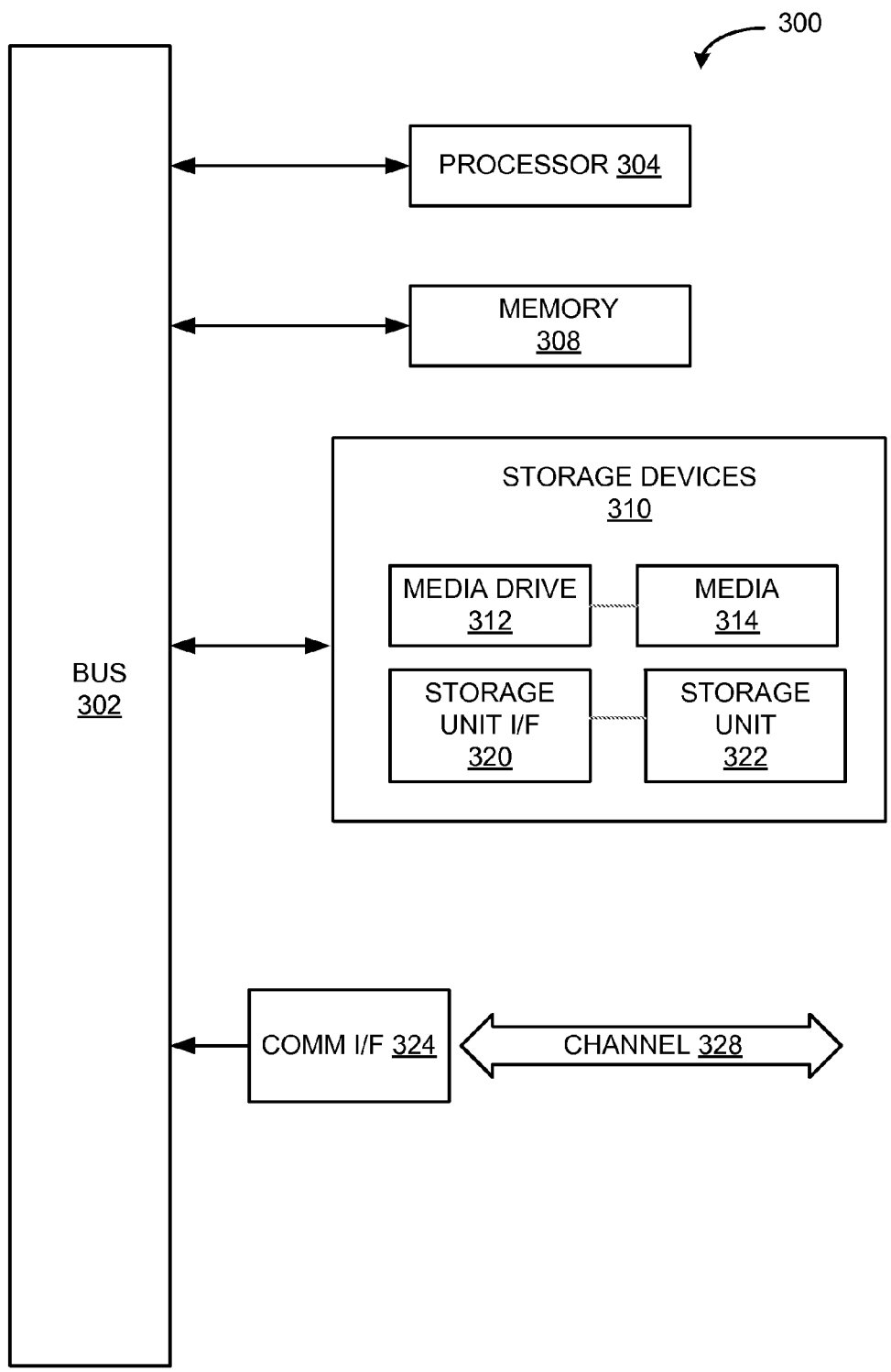
FIG. 4 illustrates a computing module for developing and using a photolithographic mask implemented in accordance with an embodiment of the invention.

As described above, embodiments of the invention employ photolithographic masks to provide the photolithographic patterns used to protect smaller features and reduce size variation across the wafer. Accordingly, data sets for these photolithographic masks may be developed and stored on non-transitory computer readable media. FIG. 4 illustrates a computing module that may be used to develop and utilize such a photomask data set.

Referring now to FIG. 4, computing module 300 may represent, for example, computing or processing capabilities found within desktop, laptop and notebook computers; handheld computing devices; mainframes, supercomputers, workstations or servers; or any other type of special-purpose or general-purpose computing devices. Computing module 300 might also represent computing capabilities embedded within or otherwise available to a given device.

Computing module 300 might include, for example, one or more processors 304. Processor 304 might be implemented using a general-purpose or special-purpose processing engine such as, for example, a microprocessor, controller, or other control logic. In the illustrated example, processor 304 is connected to a bus 302, although any communication medium can be used to facilitate interaction with other components of computing module 300 or to communicate externally.

Computing module 300 might also include one or more memory modules, simply referred to herein as main memory 308. For example, preferably random access memory (RAM) or other dynamic memory, might be used for storing information and instructions to be executed by processor 304. Main memory 308 might also be used for storing temporary variables or other intermediate information during execution of instructions to be executed by processor 304. Computing module 300 might likewise include a read only memory ("ROM") or other static storage device coupled to bus 302 for storing static information and instructions for processor 304.

The computing module 300 might also include one or more various forms of information storage mechanism 310, which might include, for example, a media drive 312 and a storage unit interface 320. The media drive 312 might include a drive or other mechanism to support fixed or removable storage media 314. For example, a hard disk drive, a floppy disk drive, a magnetic tape drive, an optical disk drive, a CD or DVD drive (R or RW), or other removable or fixed media drive might be provided. Accordingly, storage media 314 might include, for example, a hard disk, a floppy disk, magnetic tape, cartridge, optical disk, a CD or DVD, or other fixed or removable medium that is read by, written to or accessed by media drive 312. In alternative embodiments, information storage mechanism 310 might include other similar instrumentalities for allowing computer programs or other instructions or data to be loaded into computing module 300. Such instrumentalities might include, for example, a fixed or removable storage unit 322 and an interface 320.

Computing module 300 might also include a communications interface 324. Communications interface 324 might be used to allow software and data to be transferred between computing module 300 and external devices. The communications interface 324 may communicate on a channel 328. This channel 328 might be implemented using a wired or wireless communication medium In this document, the terms "computer program medium" and "computer usable medium" are used to generally refer to media such as, for example, memory 308, storage unit 320, and media 314. These and other various forms of computer program media or computer usable media may be involved in carrying one or more sequences of one or more instructions to a processing device for execution. When executed, such instructions might enable the computing module 300 to perform features or functions of the present invention as discussed herein.

In the foregoing specification, embodiments of the invention have been described with reference to specific exemplary features thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A method, comprising:
    obtaining a substrate patterned with a plurality of features and having a backfill material deposited over the plurality of features,
    the backfill material deposited over the plurality of features forming a corresponding plurality of backfill feature projections,
    a first group of the plurality of backfill feature projections having sizes greater than or equal to a threshold size and a second group of the backfill feature projections have sizes less than the threshold size; and
    removing a portion of the backfill material of a first backfill feature projection of the first group of backfill feature projections without removing the backfill material from a second backfill feature projection of the second group of backfill feature projections.

2. The method of claim 1, wherein, after the step of removing the portion of the backfill material from the first backfill feature projection, the first backfill feature projection comprises an inner sidewall, an outer sidewall, and a region of backfill material between the inner and outer sidewalls, deposited along at least a portion of a periphery of the first backfill feature projection.

3. The method of claim 2, wherein, after the step of removing the portion of the backfill material from the first backfill feature projection, the first backfill feature projection further comprises a layer of backfill material deposited over the feature corresponding to the first backfill feature projection.

4. The method of claim 2, wherein the inner sidewall of backfill material is not disposed over the feature corresponding to the first backfill feature projection.

5. The method of claim 2, wherein the width of the region of backfill material varies along the height of the region of backfill material.

6. The method of claim 1, further comprising applying a photoresist material over the substrate using a mask configured to prevent application of the photoresist material to the portion of the backfill material that is removed from the first backfill feature projection.

7. The method of claim 6, wherein the step of removing the portion of the backfill material of the first backfill feature projection comprises reactive ion etching, wet etching, or ion milling after application of the photoresist material.

8. The method of claim 6, wherein the step of removing comprises:
    isotropic etching; and
    anisotropic etching; and
    wherein after the step of removing, the first backfill feature projection comprises an inner sidewall, an outer sidewall, and a region of backfill material between the inner and outer sidewalls, deposited along at least a portion of a periphery of the first backfill feature projection, the width of the region of backfill material varying along the height of the region of backfill material.

9. The method of claim 1, further comprising, after the step of removing the portion of the backfill material from the first backfill feature projection, chemical-mechanical polishing to remove the plurality of backfill feature projections.

10. The method of claim 1, wherein the size threshold is between 1.25 and 3 times the size of the smallest feature patterned on the substrate.

* * * * *